United States Patent
Kaiser

(10) Patent No.: US 6,856,675 B1
(45) Date of Patent: Feb. 15, 2005

(54) PROCESS FOR SIGNALLING COST INFORMATION UPON CONNECTION ESTABLISHMENT AND A TARIFF SERVER THEREFOR

(75) Inventor: Bernhard Kaiser, Vaihingen/Enz (DE)

(73) Assignee: Alcatel, Paris (FR)

( * ) Notice: Subject to any disclaimer, the term of this patent is extended or adjusted under 35 U.S.C. 154(b) by 558 days.

(21) Appl. No.: 09/659,453

(22) Filed: Sep. 11, 2000

(30) Foreign Application Priority Data

Oct. 2, 1999 (DE) ......................................... 199 47 535

(51) Int. Cl.[7] ............................................. H04M 15/00
(52) U.S. Cl. ............. 379/130; 379/114.01; 379/114.03; 379/114.28; 455/406; 455/408
(58) Field of Search .......................... 379/111, 112.01, 379/114.01, 114.03, 114.05, 114.28, 114.29, 115.01, 121.04, 121.06, 122, 124, 126, 133, 130, 131, 136, 140; 455/405, 406, 408

(56) References Cited

U.S. PATENT DOCUMENTS

| | | | | | |
|---|---|---|---|---|---|
| 5,506,893 | A | * | 4/1996 | Buscher et al. | 379/114.01 |
| 5,991,379 | A | * | 11/1999 | Kusaki et al. | 379/115.01 |
| 6,002,755 | A | * | 12/1999 | Krank et al. | 379/130 |
| 6,047,050 | A | * | 4/2000 | Rothenhofer et al. | 379/114.01 |
| 6,104,792 | A | * | 8/2000 | Lautenschlager et al. | 379/130 |
| 6,195,543 | B1 | * | 2/2001 | Granberg | 455/407 |
| 6,317,490 | B1 | * | 11/2001 | Cameron et al. | 379/114.01 |
| 6,347,224 | B1 | * | 2/2002 | Smyth et al. | 455/406 |

FOREIGN PATENT DOCUMENTS

| | | | |
|---|---|---|---|
| WO | WO 96 15633 A | 5/1996 |
| WO | WO 98 44747 A | 10/1998 |
| WO | WO 98 59504 A | 12/1998 |

OTHER PUBLICATIONS

"Intelligente Netz" (Intelligent Networks), by G. Siegmund, 1999, pp. 31–41.

* cited by examiner

Primary Examiner—Quoc Tran

(57) ABSTRACT

A process for signalling cost information in a telecommunications network, wherein the subscriber's data terminal establishes a connection to an exchange, the exchange has a call handling function which makes a tariff inquiry to a tariff server and the tariff server sends a tariff response for the requested connection to the call handling function of the exchange. The call handling function forwards the tariff response to a CDR generating function in the exchange, the CDR generating function forwards cost information to the cost communication function of the exchange and the cost communication function communicates the cost information to the subscriber's data terminal.

14 Claims, 1 Drawing Sheet

System Configuration with Tariff Server

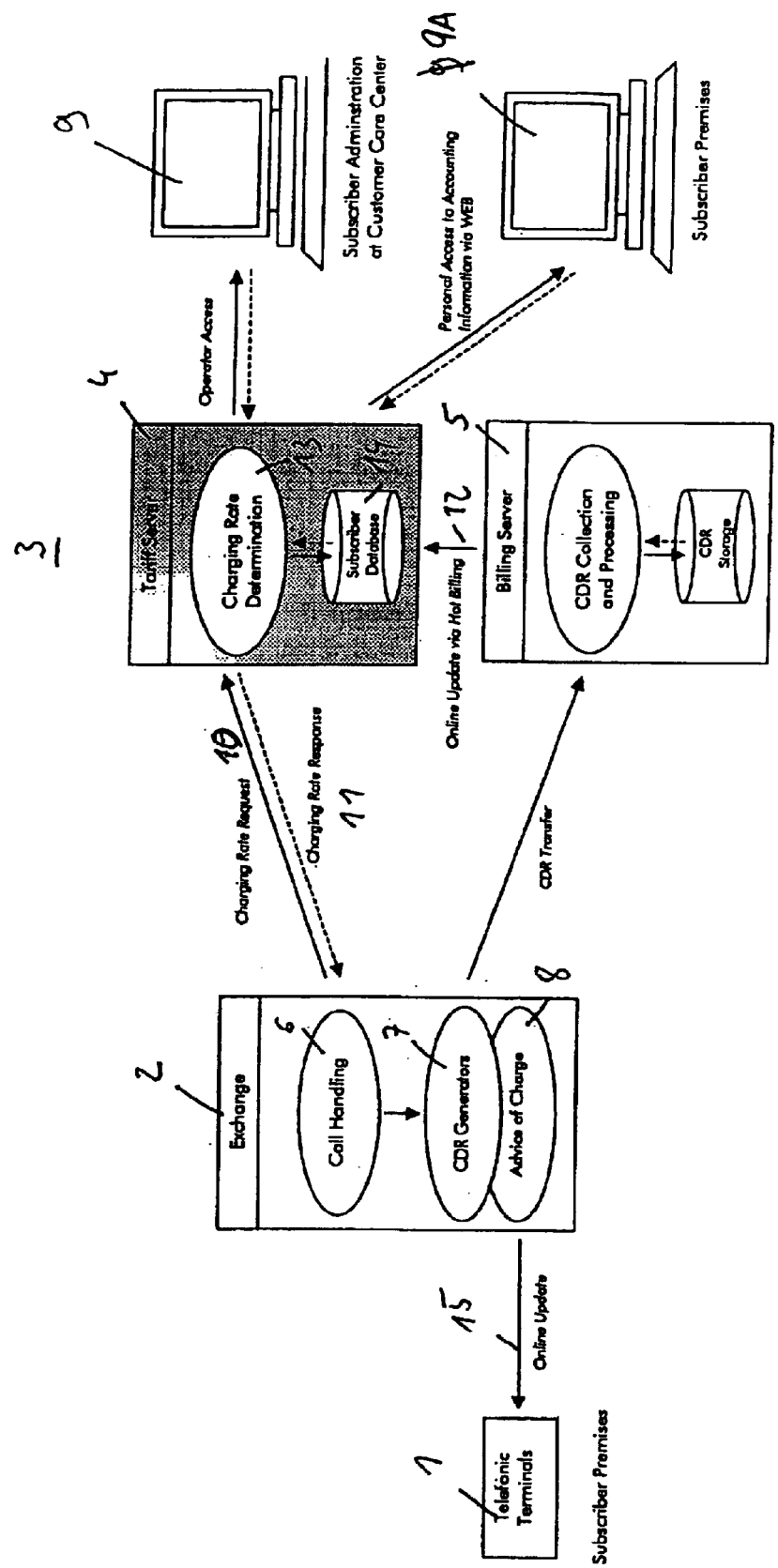
FIG. 1: System Configuration with Tariff Server

PROCESS FOR SIGNALLING COST INFORMATION UPON CONNECTION ESTABLISHMENT AND A TARIFF SERVER THEREFOR

BACKGROUND OF THE INVENTION

The invention is based on a process for signalling cost information upon connection establishment in a telecommunications network and to a tariff server therefor according to the preambles of the independent claims.

So-called call handling in the exchange is known. The call handling process is very limited as it does not take the individual subscribers into account but merely determines the tariff rate globally according to criteria relating to time, date, distance and service used. However, this process permits the display of the costs on a charge meter during the telephone connection.

Superimposed on the conventional communications network for circuit-switched connections is a so-called intelligent network (IN) with the aid of which, over and beyond the pure connection establishment, a number of other services can be provided. To use a specific service of this intelligent network, it is firstly necessary to dial a service code. The service code is necessary to reach a so-called service switching point (SSP) which switches the required service on the basis of the service code as so-called service switching function (SSF). For this purpose, the SSP evaluates the transmitted service code and, via a so-called service transfer point (STP), then approaches a service control computer, the so-called service control point (SCP) which then controls the provision of the requested service. The SSP is the interface between the conventional communications network and the intelligent network. STP and SCP are components of the intelligent network. A general description of an intelligent network is to be found in the book "Intelligente Netze" (Intelligent Networks) by G. Siegmund, 1999, p. 31 ff.

A signalling network, which at the present time normally operates using Signalling System No. 7 of ITU-T, is also linked to or superimposed upon the conventional communication network. This signalling system and the associated signalling network are generally known under the abbreviation #7. This signalling system is also used in the intelligent network. The above mentioned service transfer point (STP) of the intelligent network here is identical to the identically abbreviated signalling transfer point (STP) of the signalling network #7. An advantage of the possible services in an intelligent network is the provision of individual bills relating to the costs of the connections. At the end of an IN connection, a call record containing all the important data for this call is created by the SSP and STP. These records are sent to the service management point (SMP), which, in addition to the statistics function, determines the charge information therefrom. In the SMP the reported results of the call or service can be linked with the charge metering by the service provider in order to produce a billing ticket therefrom.

The structure of the specific charge metering for different telephone services constitutes a key point for the network operators. The cost structures for connections are a fundamental means of distinguishing and differentiating between the various service providers. The currently existing methods of determining and displaying costs are unsatisfactory. They cannot provide the relevant customer with information until after a connection has ended.

SUMMARY OF THE INVENTION

Therefore the object of the present invention is to propose a process which enables the subscriber in a telecommunications network to be sent information about costs before and during a connection.

This object is achieved in accordance with the invention by a process for signaling cost information upon a connection in a telecommunications network information in a telecommunications network, the process comprising the steps of: the subscriber's data terminal establishing a connection to an exchange; a call handling function of the exchange making a tariff request to a tariff server; the tariff server sending a tariff response for the requested connection to the call handling function of the exchange; the call handling function forwarding the tariff response to a CDR generating function in the exchange; the CDR generating function forwarding cost information to the cost communication function of the exchange; and the cost communication function communicating the cost information to the subscriber's data terminal.

The object of the invention is further achieved by a tariff server with connections to the exchange, to a bill server, to a service operator, and to a data terminal of subscribers, and wherein the tariff server has a charging rate function which is connected to a subscriber database.

The process according to the invention and tariff server according to the invention have the particular advantage that the cost information is made available to the subscriber directly before and during a connection.

Further advantageous developments of the invention are disclosed in detail in the sub-claims and in the description.

BRIEF DESCRIPTION OF THE DRAWINGS

FIG. 1 illustrates the construction of a network according to the invention. FIG. 1 shows a data terminal 1 from which connections are made to an exchange 2. The exchange 2 contains functions of the SSP and of the SCP. The exchange 2 has a call handling function 6 and a CDR (call detail records)—generating function 7 as well as a cost communication function 8. The exchange 2 is connected to a service management point (SMP) 3. A tariff server 4 and a bill server 5 are arranged in the service management point 3. The service management point (SMP) is also connected to external access units 9 and 9A.

DETAILED DESCRIPTION OF THE INVENTION

Upon a connection establishment between the data terminal 1 of the subscriber and the exchange 2, the call handling function 6 receives the requested connection data. The call handling function makes an inquiry to the tariff server 4 about the tariff for the desired connection in a tariff inquiry 10. In the tariff server the charging rate determination function 13 requests the desired tariff information in a database 14. Information about the subscriber and the subscriber's specific tariff conditions are stored in this database. Via the charging rate determination function 13 of the tariff server 4 the tariff server answers the inquiry from the call handling function 6 with a tariff response 11. The call handling function 6 forwards the tariff response 11 to the CDR generator 7 and the cost communication function 8 of the exchange 2. This cost communication function 8 sends the information directly to the subscriber's data terminal 1 via a signalling channel 15. In this way the tariff for the desired connection is communicated to the subscriber actually prior to the connection establishment. The information is also updated during an existing connection. The CDR generator 7 determines the units already consumed in the current connection. The CDR generator 7 is also connected to a bill server 5. In this bill server 5 the CDR units are collected, processed on the basis of the current tariff, and possibly intermediately stored. The information relating to the accrued units is forwarded to the tariff server 4 via a so-called hot billing channel 12. This information ensures that the current costs are available to the subscriber in the database. The current costs are then forwarded to the exchanges and to the subscriber by means of the tariff inquiry and tariff response.

The tariff server 4 also has various access facilities 9 and 9A. Via a service center 9 the service provider can access the tariff server 4 and adapt the current subscribers and their current tariffs. An access facility 9 for a personal inquiry about current personal tariffs is also available to the subscriber in the telecommunications network. This current inquiry can be made using the data terminal or via the internet using a PC.

What is claimed is:

1. A process for signaling cost information in a telecommunications network comprised of a plurality of exchanges, wherein the process comprises:

establishing a connection between a subscriber's terminal and an exchange of the plurality of exchanges, forwarding a tariff request for a to-be-completed telephone call or an on-going telephone call from a call handling function resident in the exchange to an independent tariff server, wherein the tariff server is connected to several of the exchanges comprising the telecommunications network and receives tariff requests from the exchanges, receiving a tariff response at the call handling function at the exchange from the tariff server for the requested connection, forwarding the tariff response from the call handling function to a CDR generating function in the exchange, forwarding current cost information from the CDR generating function to the cost communication function of the exchange, and communicating the current cost information from the cost communication function to the subscriber's terminal prior to the establishment of the to-be-completed telephone call or during the on-going telephone call, wherein the exchange forwards the current cost information to a bill server and the bill server updates a subscriber database resident on the tariff server with the received current cost information.

2. The process for signaling cost information according to claim 1, wherein the tariff server accesses a subscriber database containing current tariff data.

3. The process for signaling cost information according to claim 1, wherein the tariff response is updated during the existing on-going telephone call.

4. The process for signaling cost information according to claim 1, wherein the current cost information or the current tariff data for a subscriber is accessed from a terminal coupled to the subscriber database.

5. The process for signaling cost information according to claim 1, wherein service provider accesses the subscriber database to update the current tariff data for a subscriber.

6. An independent tariff server coupled to a plurality of exchanges and to a bill server, the independent tariff server comprising a charging rate function which is connected to a subscriber database and receiving tariff requests from the plurality of exchanges, and, in response to a tariff request that is received from one of the exchanges of the plurality of exchanges for a to-be-completed telephone call or an on-going telephone call, the charging rate function generates a tariff response that is used to determine current cost information of the to-be-completed telephone call or the on-going telephone call, wherein the bill server updates the subscriber database with the current cost information that is generated by the one exchange and forwarded to the bill server.

7. The tariff server according to claim 6, wherein the tariff response is updated during the existing on-going telephone call.

8. The tariff server according to claim 6, wherein the tariff server accesses the subscriber database containing current tariff data for a subscriber to generate the tariff response.

9. The tariff server according to claim 6, wherein the current cost information or the current tariff data for a subscriber is accessed from a terminal coupled to the subscriber database.

10. The tariff server according to claim 6, wherein service provider accesses the subscriber database to update the current tariff data for a subscriber.

11. An exchange for signaling cost information in a telecommunications network comprised of a plurality of exchanges, wherein the exchange comprises:

a call handling function that forwards a tariff request to an independent tariff server coupled to the exchange and to other exchanges in the plurality of exchanges, and the tariff server receives tariff requests from the other exchanges, wherein the call handling function receives the tariff response that is returned from the tariff server in response to the tariff request, a CDR generating function that receives the tariff response from the call handling function and generates current cost information from the tariff response, and a cost communication function that communicates the current cost information from the cost communication function to a subscriber's terminal, wherein the exchange forwards the current cost information to a bill server and the bill server updates a subscriber database resident on the tariff server with the received current cost information.

12. The exchange according to claim 11, wherein the CDR generating function updates the current cost information upon the establishment of a to-be-completed telephone call.

13. The exchange according to claim 11, wherein the CDR generating function updates the current cost information during the pendency of an on-going telephone call.

14. The exchange according to claim 11, wherein the exchange receives an updated tariff response is updated during an on-going telephone call.

* * * * *